US009725051B2

(12) United States Patent
Lohr et al.

(10) Patent No.: US 9,725,051 B2
(45) Date of Patent: Aug. 8, 2017

(54) ENGINE COVER ASSEMBLY FEATURE

(71) Applicant: Ford Global Technologies, LLC, Dearborn, MI (US)

(72) Inventors: John Carl Lohr, Beverly Hills, MI (US); Sandra Davidson Osip, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 14/701,897

(22) Filed: May 1, 2015

(65) Prior Publication Data

US 2016/0319740 A1 Nov. 3, 2016

(51) Int. Cl.
*F02B 77/00* (2006.01)
*B60R 13/08* (2006.01)

(52) U.S. Cl.
CPC ................................ *B60R 13/0838* (2013.01)

(58) Field of Classification Search
CPC ........ F02F 7/006; F02F 11/002; F02F 7/0073; F02F 7/0082; F02F 2007/0063; F02F 2007/0075; F02F 7/0065; F02F 7/0068; F01M 2011/0491; F02B 77/00
USPC ............................... 123/195 C, 198 E, 195 R
See application file for complete search history.

(56) References Cited

U.S. PATENT DOCUMENTS 5,245,961 A * 9/1993 Miyakubo ............ B60K 5/1216 123/195 C
5,328,311 A * 7/1994 Knohl ..................... F02B 77/00 411/107
7,040,268 B1 * 5/2006 Fonville .................. F02F 7/006 123/90.37
7,765,970 B2 * 8/2010 Sammons ............... F02F 7/006 123/195 C
7,845,322 B2 * 12/2010 Dunsch ................... F01L 1/053 123/193.5
8,635,983 B2 * 1/2014 Enokida ............. F01M 11/0004 123/195 C
8,800,518 B2 * 8/2014 Smith ..................... F02F 7/006 123/195 C
2008/0295796 A1 * 12/2008 Dunsch ................... F01L 1/053 123/195 C
2012/0314429 A1 * 12/2012 Plunk .................... F21V 17/105 362/374
2015/0369269 A1 * 12/2015 Holt ...................... F16B 5/0241 411/108

* cited by examiner

*Primary Examiner* — Stephen K Cronin
*Assistant Examiner* — Long T Tran
(74) *Attorney, Agent, or Firm* — LeClairRyan

(57) ABSTRACT

An engine cover having a feature that macro aligns the engine cover to the engine to quickly orientate the engine cover for correct assembly is provided. The features allow the installer to align the engine cover by touch. The locating lip is a macro feature formed integrally with the engine cover. The system includes an engine cover, a body attached to and extending from the engine cover. The body has an outer surface and an aperture for receiving a mechanical fastener. The aperture is formed through the outer surface. A locating lip extends outwardly from the outer surface. A doghouse feature may be formed on the engine cover. The body may be in the shape of an elongated tower that is attached to and extends from the doghouse feature. The locating lip is defined by a wall. The wall may be a ring-shaped wall or may be a semi-circular wall.

16 Claims, 3 Drawing Sheets

12
10
14
16
24

ENGINE COVER ASSEMBLY FEATURE

TECHNICAL FIELD

The disclosed inventive concept relates generally to engine covers for vehicle engines. More particularly, the disclosed inventive concept relates to engine covers having macro alignment features formed thereon that allow the installer to readily orient the engine cover for correct installation.

BACKGROUND OF THE INVENTION

Vehicle engine compartments as are known today provide only a relatively small space in which to package the vehicle engine and its peripheral components. Today's vehicle engineers and designers are challenged by requirements relating to functionality, serviceability and aesthetics. In addition, vehicle engineers and designers must also respond to manufacturing and assembly costs which are in addition to the need to continually reduce vehicle weight.

One component that has become increasingly popular in the vehicle engine compartment is the engine cover. The engine cover serves the dual-purpose of enhancing the overall appearance of the engine compartment and reducing engine noise. The engine cover may be attached to either an engine component or a powertrain component or, in the case of a front wheel drive vehicle, may be attached to both engine and powertrain components.

The engine cover is typically cast or molded from a polymerized material. However, known engine covers lack any visual reference as to how the engine cover should be installed relative to the engine. Accordingly, during vehicle assembly, it is possible for installers to misassemble the engine cover thus resulting in an incorrectly fitted engine cover.

Thus a new approach to attaching an engine cover to a substrate such as an engine component or a powertrain component is needed to address the problems associated with known arrangements.

SUMMARY OF THE INVENTION

The disclosed inventive concept overcomes the challenges faced by known engine cover arrangements by providing an engine cover having a feature that macro aligns the engine cover to the engine to quickly orientate the engine cover for correct assembly. The features allow the installer to align the engine cover by touch. The locating lip is a macro feature formed integrally with the engine cover.

The system of the disclosed inventive concept includes an engine cover, a body attached to and extending from the engine cover, the body having an outer surface and an aperture for receiving a mechanical fastener, the aperture being formed through the outer surface. A locating lip extends outwardly from the outer surface.

A doghouse feature may be formed on the engine cover. The body may be in the shape of an elongated tower that is attached to and extends from the doghouse feature.

The locating lip is defined by a wall. The wall may be ring-shaped or may be a semi-circular wall. The semi-circular wall is characterized as an eyebrow feature because of its shape.

As an alternative arrangement, the alignment feature may be associated with an oil cap hole formed in the engine cover.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
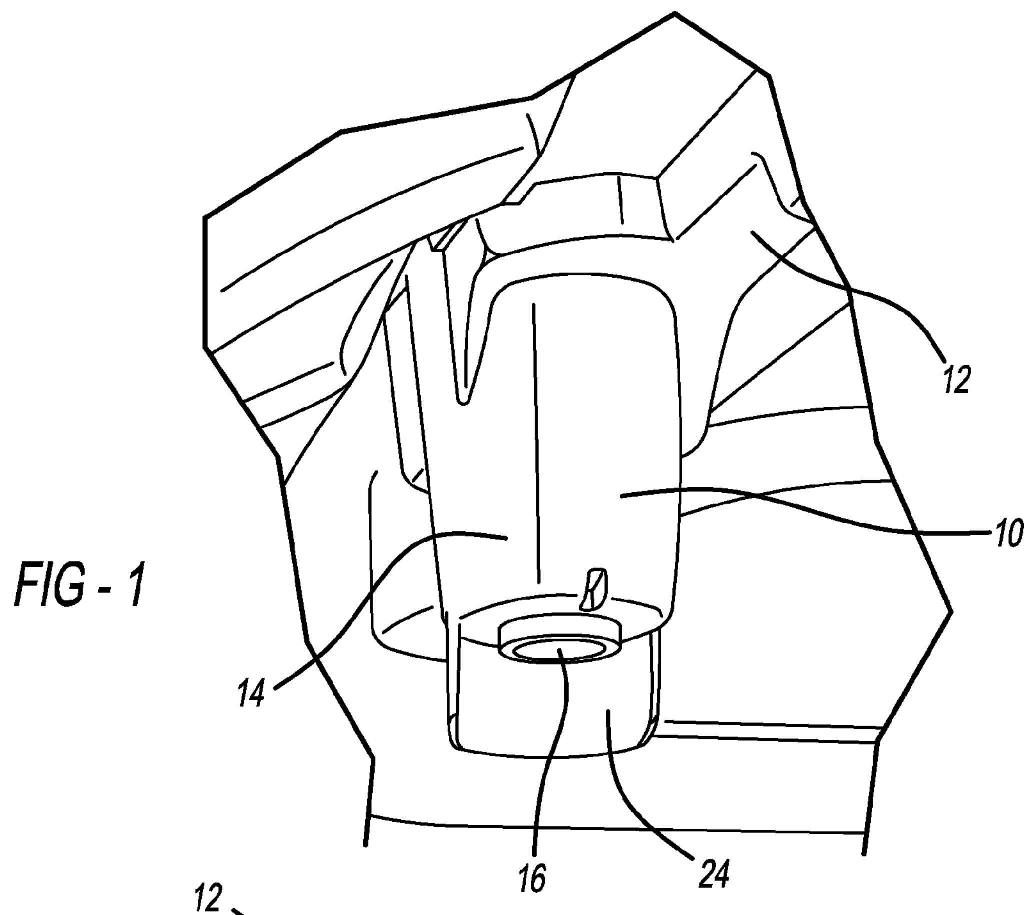
FIG. 1 is a perspective view showing the macro alignment feature on engine cover according to the disclosed inventive concept.

In the following figures, the same reference numerals will be used to refer to the same components. In the following description, various operating parameters and components are described for different constructed embodiments. These specific parameters and components are included as examples and are not meant to be limiting.

Figure 2:
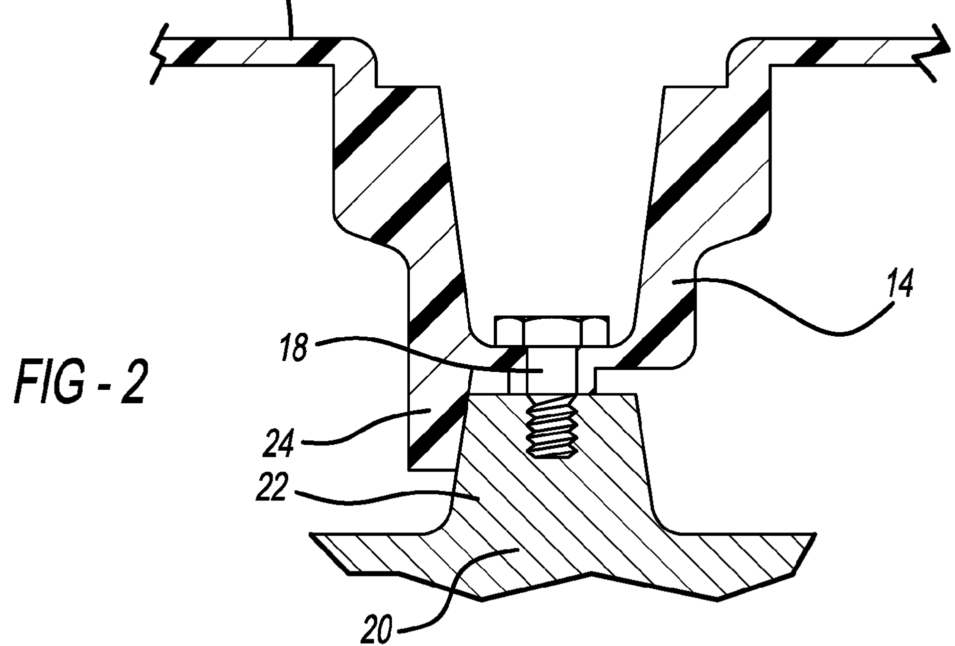
FIG. 2 is a sectional view of a portion of the engine cover of FIG. 1 attached to an engine component showing the engine cover alignment feature of the disclosed inventive concept.

Referring to FIG. 1, a perspective view of a preferred embodiment of the engine cover alignment feature of the disclosed inventive concept is illustrated. Referring to FIG. 2, a sectional view of the alignment feature of FIG. 1 is illustrated attached to a substrate. Reference will now be made to both of these figures.

A doghouse 10 of an engine cover 12 is illustrated. A fastener tower 14 extends from and is preferably integrally formed with the engine cover 12 and includes a fastener hole 16 through which an engine cover fastener, such as shoulder bolt 18, is provided to attach the engine cover 12 to the underlying substrate, such as an engine component 20. The substrate, in this case the engine component 20, includes a screw boss 22 formed on the engine component 20. Alternatively, the engine cover 12 may be attached to a powertrain component or, in the case of a front wheel drive vehicle, may be attached to both engine and powertrain components.

The shape and size of the engine cover 12 are shown for illustrative purposes only and are not intended as being limiting. In addition, while the substrate is illustrated as being an engine component, it is to be understood that the substrate may be attached, either alternatively or additionally, to the vehicle's powertrain.

The fastener tower 14 includes an alignment feature 24 having the general shape of an eyebrow. The eyebrow-shaped alignment feature 24 allows the installer to readily position the engine cover 12 with respect to the screw boss 22 of the engine component 20 or other substrate.

Figure 3:
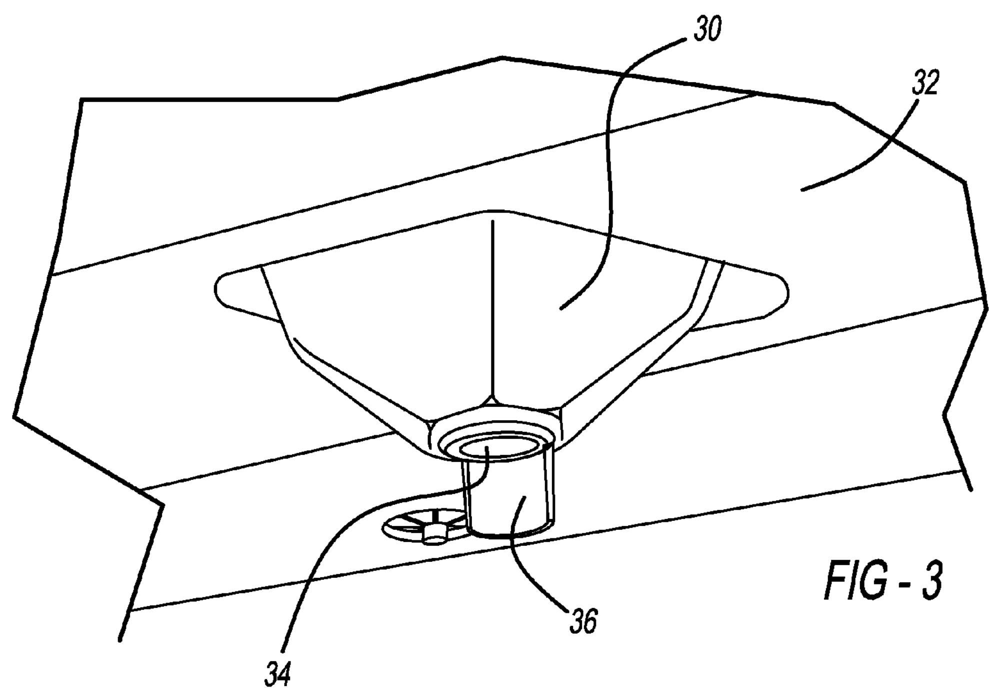
FIG. 3 is a perspective view showing the eyebrow alignment feature of an engine cover according to an alternative embodiment of the disclosed inventive concept.

FIG. 3 illustrates an alternative embodiment of the macro alignment feature of the disclosed inventive concept. In this figure, a fastener tower 30 extends from an engine cover 32. The fastener tower 30 includes a fastener hole 34 through which an engine cover fastener, such as the shoulder bolt of FIG. 2, is provided to attach the engine cover 32 to the underlying substrate, such as the engine component of FIG. 2.

The shape and size of the engine cover 32 are shown for illustrative purposes only and are not intended as being limiting. In addition, while the substrate is suggested as being an engine component, it is to be understood that the substrate may be any other component of the engine to which the engine cover 12 may suitably be attached.

The fastener tower 30 includes an alignment feature 36 having the general shape of an eyebrow. The eyebrow-shaped alignment feature 36 allows the installer to readily position the engine cover 32 with respect to the screw boss of the substrate.

Figure 4:
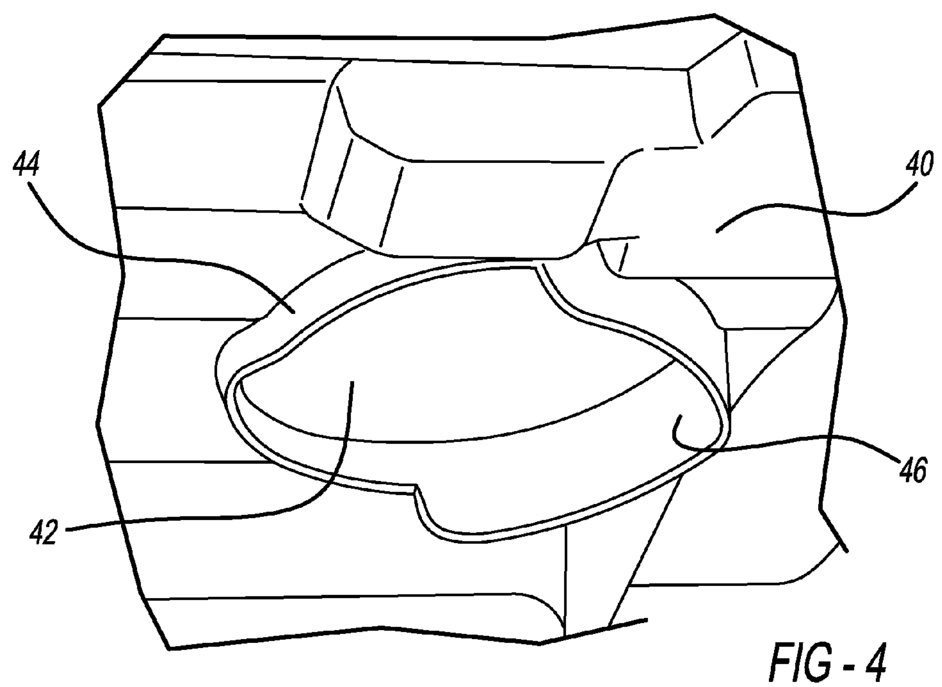
FIG. 4 is a perspective view showing the eyebrow alignment feature associated with an oil cap hole of an engine cover oil cap hole of engine cover.

FIG. 4 illustrates an alternative alignment arrangement for the engine cover according to the disclosed inventive concept. Particularly, FIG. 4 provides an alignment feature for fitting an engine cover to a substrate having an oil cap hole for placement over the engine's oil fill hole.

Referring to FIG. 4, an engine cover 40 includes a hole 42 for the engine oil cap (not shown). A raised peripheral wall 44 is formed along the periphery of the hole 42 to enhance structural integrity and to provide a more finished look to the engine cover 40.

An eyebrow alignment feature 46 extends from a portion of the raised peripheral wall 44. The eyebrow alignment feature 46 may extend along the raised peripheral wall 44 to a greater or lesser degree than that shown.

The eyebrow alignment feature 24 of FIGS. 1 and 2, the eyebrow alignment feature 36 of FIG. 3, and the eyebrow alignment feature 46 of FIG. 4 provide a first general approach to solving the problem of aligning an engine cover to a substrate such as an engine component as is known. As a further approach, the alignment feature does not necessarily need to be limited to such eyebrow configurations, but may provide an alignment feature that is a full ring. This approach is illustrated in FIG. 5 in which a full ring or circle guide is provided to the doghouse of an engine cover.

Figure 5:
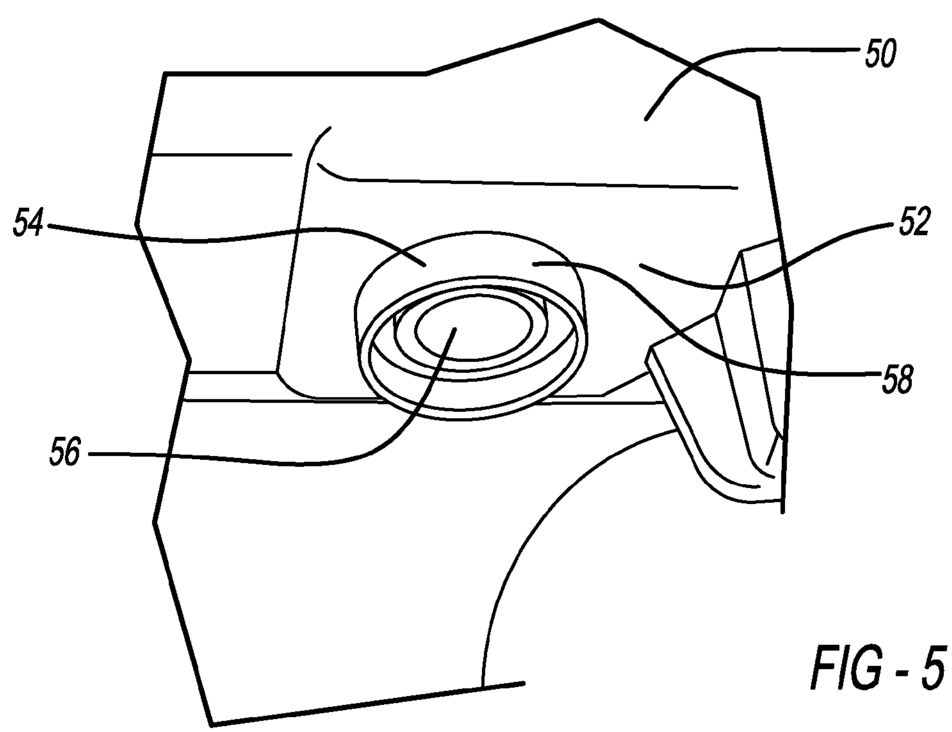
FIG. 5 perspective view showing full ring guide alignment feature associated with doghouse of engine cover.

Particularly, and referring to FIG. 5, an engine cover 50 includes a doghouse 52 formed thereon. An alignment feature 54 is formed on the doghouse 52. A fastener hole 56 for a fastener (not shown) is formed in the alignment feature 54. A peripheral elevated ring 58 defines the alignment wall of the alignment feature 54.

The disclosed inventive concept as set forth above overcomes the challenges faced by known engine covers for alignment onto an engine substrate, such as an engine component or powertrain component. Accordingly, one skilled in the art will readily recognize from such discussion, and from the accompanying drawings and claims, that various changes, modifications and variations can be made therein without departing from the true spirit and fair scope of the invention as defined by the following claims.

What is claimed is:

1. An orientating feature for aligning an engine cover to a substrate, the feature comprising: an engine cover; a body attached to and extending from said engine cover, said body having an aperture for receiving a mechanical fastener, said body having an outer surface, said aperture being formed through said outer surface; and a lip extending outwardly from said outer surface, said lip being a semicircular wall defined by a ring.

2. The orientating feature for aligning an engine cover to a substrate of claim 1, wherein said body is an elongated tower.

3. The orientating feature for aligning an engine cover to a substrate of claim 2, further including a doghouse feature formed on said engine cover, said tower being attached to said doghouse feature.

4. The orientating feature for aligning an engine cover to a substrate of claim 1, wherein said engine cover includes a hole and wherein said body is formed around said hole.

5. The orientating feature for aligning an engine cover to a substrate of claim 1, wherein said lip is a macro feature.

6. An orientating feature for aligning an engine cover to a substrate, the feature comprising:

an engine cover;

a body attached to and extending from said engine cover, said body having an aperture for receiving a mechanical fastener, said body having an outer surface, said aperture being formed through said outer surface; and a locating lip extending outwardly from said outer surface, said lip being a semi-circular wall.

7. The orientating feature for aligning an engine cover to a substrate of claim 6, wherein said body is an elongated tower.

8. The orientating feature for aligning an engine cover to a substrate of claim 7, further including a doghouse feature formed on said engine cover, said tower being attached to said doghouse feature.

9. The orientating feature for aligning an engine cover to a substrate of claim 8, wherein said semi-circular wall defines an eyebrow feature.

10. The orientating feature for aligning an engine cover to a substrate of claim 6, wherein said locating lip is a macro feature.

11. A system for aligning an engine cover to an engine, the system comprising:

a body having a center, said body having a centrally-formed aperture, said body having an outer surface, said aperture being formed through said outer surface; and a locating lip extending outward from said outer surface, said lip being a semi-circular wall.

12. The system for aligning an engine cover to an engine of claim 11, wherein said body is an elongated tower.

13. The system for aligning an engine cover to an engine of claim 12 further including a doghouse feature formed on said engine cover, said tower being attached to said doghouse feature.

14. The system for aligning an engine cover to an engine of claim 11, wherein said semi-circular wall defines an eyebrow feature.

15. The system for aligning an engine cover to an engine of claim 11, wherein said locating lip is a macro feature.

16. The system for aligning an engine cover to an engine of claim 11, wherein said body is integrally formed with the engine cover.

* * * * *